(12) United States Patent
Tabone et al.

(10) Patent No.: US 9,483,168 B2
(45) Date of Patent: Nov. 1, 2016

(54) CORRECTING SCROLLING GESTURE

(75) Inventors: Ryan Tabone, San Francisco, CA (US);
Andrew de los Reyes, Belmont, CA (US)

(73) Assignee: Google Inc., Mountain View, CA (US)

( * ) Notice: Subject to any disclaimer, the term of this patent is extended or adjusted under 35 U.S.C. 154(b) by 740 days.

(21) Appl. No.: 13/592,092

(22) Filed: Aug. 22, 2012

(65) Prior Publication Data
US 2015/0227220 A1 Aug. 13, 2015

(51) Int. Cl.
*G06F 3/048* (2013.01)
*G06F 3/0485* (2013.01)
*G06F 3/0354* (2013.01)
*G06F 3/01* (2006.01)

(52) U.S. Cl.
CPC .......... *G06F 3/0485* (2013.01); *G06F 3/03547* (2013.01); *G06F 3/016* (2013.01)

(58) Field of Classification Search
CPC ............... G06F 13/16; G06F 13/0485; G06F 13/0488; G06F 2203/04808
See application file for complete search history.

(56) References Cited

U.S. PATENT DOCUMENTS

| | | | |
|---|---|---|---|
| 5,305,017 A | 4/1994 | Gerpheide | |
| 6,147,680 A | 11/2000 | Tareev | |
| 6,297,811 B1 | 10/2001 | Kent et al. | |
| 7,030,782 B2 | 4/2006 | Ely et al. | |
| 7,129,935 B2 | 10/2006 | Mackey | |
| 7,202,859 B1 | 4/2007 | Speck et al. | |
| 7,218,124 B1 | 5/2007 | Mackey et al. | |
| 7,382,139 B2 | 6/2008 | Mackey | |
| 7,394,458 B2 | 7/2008 | Lyon et al. | |
| 7,423,635 B2 | 9/2008 | Taylor et al. | |
| 7,463,246 B2 | 12/2008 | Mackey | |
| 7,479,949 B2 | 1/2009 | Jobs et al. | |
| 7,545,289 B2 | 6/2009 | Mackey et al. | |
| 7,548,073 B2 | 6/2009 | Mackey et al. | |
| 7,737,953 B2 | 6/2010 | Mackey | |
| 7,764,274 B2 | 7/2010 | Westerman et al. | |

(Continued)

FOREIGN PATENT DOCUMENTS

CN 101655754 A 2/2010
CN 101763191 A 6/2010

(Continued)

OTHER PUBLICATIONS

Non-Final Office Action for U.S. Appl. No. 13/709,931, mailed Jan. 13, 2014, 22 pages.

(Continued)

*Primary Examiner* — Liliana Cerullo
(74) *Attorney, Agent, or Firm* — Brake Hughes Bellermann LLP

(57) ABSTRACT

A non-transitory computer-readable storage medium may comprise instructions stored thereon. When executed by at least one processor, instructions may be configured to cause a computing system to at least receive, on a tactile input device of the computing system, a first contact and a second contact, the first and second contacts being maintained on the tactile input device, at least one of the first and second contacts changing location on the tactile input device, determine a direction of movement by the first and second contacts based on the at least one of the first and second contacts changing locations on the tactile input device, assign the determined direction of movement to one of a plurality of directional zones, and modify the determined direction based on the assigned directional zone.

27 Claims, 14 Drawing Sheets

(56) References Cited

U.S. PATENT DOCUMENTS

| | | |
|---|---|---|
| 7,834,862 B2 | 11/2010 | Liao et al. |
| 8,040,321 B2 | 10/2011 | Peng et al. |
| 8,069,735 B1 | 12/2011 | Egorov |
| 8,072,429 B2 | 12/2011 | Grivna |
| 8,121,283 B2 | 2/2012 | Peng et al. |
| 8,130,203 B2 | 3/2012 | Westerman |
| 8,159,467 B2 | 4/2012 | Gray et al. |
| 8,274,486 B2 | 9/2012 | Barbier et al. |
| 8,610,687 B2 | 12/2013 | Chang et al. |
| 8,656,311 B1 * | 2/2014 | Harper et al. ............... 715/854 |
| 9,007,191 B2 | 4/2015 | Tenuta |
| 9,007,192 B2 | 4/2015 | Tenuta |
| 2002/0036618 A1 * | 3/2002 | Wakai et al. ................ 345/157 |
| 2007/0057167 A1 | 3/2007 | Mackey et al. |
| 2007/0229470 A1 | 10/2007 | Snyder et al. |
| 2009/0009366 A1 * | 1/2009 | Chiu et al. ...................... 341/20 |
| 2009/0166100 A1 | 7/2009 | Matsubara |
| 2009/0194344 A1 | 8/2009 | Harley et al. |
| 2009/0206845 A1 | 8/2009 | Mackey |
| 2009/0273570 A1 | 11/2009 | Degner et al. |
| 2009/0315570 A1 | 12/2009 | Chappell et al. |
| 2010/0045614 A1 | 2/2010 | Gray et al. |
| 2010/0231555 A1 | 9/2010 | Mackey |
| 2010/0302201 A1 | 12/2010 | Ritter et al. |
| 2011/0025627 A1 * | 2/2011 | Sakai .................. G06F 3/0485 345/173 |
| 2011/0037724 A1 | 2/2011 | Paulsen et al. |
| 2011/0074714 A1 * | 3/2011 | Ogawa et al. ................ 345/173 |
| 2011/0084927 A1 * | 4/2011 | Chang .................. G06F 3/0416 345/173 |
| 2011/0298724 A1 * | 12/2011 | Ameling et al. ............. 345/173 |
| 2012/0057081 A1 * | 3/2012 | Petersson et al. ............ 348/734 |
| 2012/0062497 A1 | 3/2012 | Rebeschi et al. |
| 2012/0105356 A1 | 5/2012 | Brosnan et al. |
| 2012/0154332 A1 | 6/2012 | Chang et al. |
| 2012/0227259 A1 | 9/2012 | Badaye et al. |
| 2013/0127775 A1 | 5/2013 | Yilmaz et al. |
| 2014/0097948 A1 | 4/2014 | Tenuta |
| 2014/0098046 A1 | 4/2014 | Tenuta |

FOREIGN PATENT DOCUMENTS

| | | |
|---|---|---|
| DE | 202012102387 U1 | 9/2012 |
| EP | 2157500 A2 | 2/2010 |
| TW | 200842681 A | 11/2008 |
| WO | 2014055742 A1 | 4/2014 |

OTHER PUBLICATIONS

Non-Final Office Action for U.S. Appl. No. 14/046,406, mailed Jan. 13, 2014, 30 pages.
Non-Final Office Action for U.S. Appl. No. 13/709,931, mailed Aug. 6, 2014, 36 pages.
Final Office Action for U.S. Appl. No. 14/046,406, mailed Aug. 1, 2014, 37 pages.
Search Report and Written Opinion for International Application No. PCT/US2013/063231, mailed Dec. 4, 2013, 7 pages.
Notice of Allowance for U.S. Appl. No. 13/709,931, mailed on Dec. 17, 2014, 5 pages.
Notice of Allowance for U.S. Appl. No. 14/046,406, mailed on Dec. 17, 2014, 5 pages.
Non-Final Office Action Response for U.S. Appl. No. 13/709,931, filed Dec. 8, 2014, 12 pages.
International Preliminary Report on Patentability received for PCT Application No. PCT/US2013/063231, mailed on Apr. 16, 2015, 5 pages.
Office Action from corresponding application CN201380051890.2, mailed May 30, 2016, 25 Pages.

* cited by examiner

CORRECTING SCROLLING GESTURE

TECHNICAL FIELD

This description relates to computer input devices, such as tactile input devices or trackpads.

BACKGROUND

Users may provide input into computing systems by tactile input devices such as trackpads. However, when they move their fingers along the tactile input devices, the direction of movement of their fingers may not match their intended movement.

SUMMARY

According to one general aspect, a non-transitory computer-readable storage medium may comprise instructions stored thereon. When executed by at least one processor, instructions may be configured to cause a computing system to at least receive, on a tactile input device of the computing system, a first contact and a second contact, the first and second contacts being maintained on the tactile input device, at least one of the first and second contacts changing location on the tactile input device, determine a direction of movement by the first and second contacts based on the at least one of the first and second contacts changing locations on the tactile input device, assign the determined direction of movement to one of a plurality of directional zones, and modify the determined direction based on the assigned directional zone.

According to another general aspect, a computing system may comprise a display, a tactile input device comprising at least one sensor, at least one processor configured to execute instructions, receive input signals from the at least one sensor of the tactile input device, and send output signals to the display, and at least one memory device. The at least one memory device may comprise instructions stored thereon that, when executed by the at least one processor, are configured to cause the computing system to at least receive, on the tactile input device, a first contact and a second contact, the first and second contacts being maintained on the tactile input device, at least one of the first and second contacts changing location on the tactile input device, determine a direction of movement by the first and second contacts based on the at least one of the first and second contacts changing locations on the tactile input device, assign the determined direction of movement to one of a plurality of directional zones, and modify the determined direction based on the assigned directional zone.

According to another general aspect, a method may comprise receiving, on a tactile input device, a first contact and a second contact, the first and second contacts being maintained on the tactile input device, at least one of the first and second contacts changing location on the tactile input device, determining a direction of movement by the first and second contacts based on the at least one of the first and second contacts changing locations on the tactile input device, assigning the determined direction of movement to one of a plurality of directional zones, and modifying the determined direction based on the assigned directional zone.

The details of one or more implementations are set forth in the accompanying drawings and the description below. Other features will be apparent from the description and drawings, and from the claims.

DETAILED DESCRIPTION

A tactile input device for use with a computing device can be used to communicate with and control operations of the computing device. The tactile input device may include, for example, a trackpad or touch pad. The tactile input device can be configured to be contacted by a user on a top surface of the tactile input device to trigger an electronic signal within the computing device. For example, a user can slide or move one or more fingers, or in some cases, knuckles or a portion of a hand, across the top surface of the tactile input device to move a cursor visible on a display of the computing device. The tactile input device can also include a "scroll" function to allow the user to for example, scroll vertically or horizontally across the display. The scroll function may be equivalent to rolling a wheel on a mouse, or typing "page up" or "page down" buttons on the keyboard. The user may actuate the scroll function by holding both fingers down on the tactile input device, and moving one or both fingers in the horizontal or vertical direction. The tactile input device may respond by recognizing the fingers as a scroll gesture, and provide a scroll gesture output to other components of the computing system.

When the user attempts to actuate the scroll function on the tactile input device, he or she may be unable to move his or her finger(s) in a completely vertical or horizontal direction across the tactile input device. In embodiments described herein, the tactile input device may recognize movements that are nearly horizontal or vertical, or within a defined directional zone, as horizontal or vertical, and provide the scrolling output.

As used herein, a reference to a top view in a figure refers to a view as viewed by a user during use of the tactile input device. For example, a top view can refer to a view of the tactile input device as disposed within a computing device such that the user can contact the top surface of the tactile input device to initiate an action within the computing device.

Figure 1A:
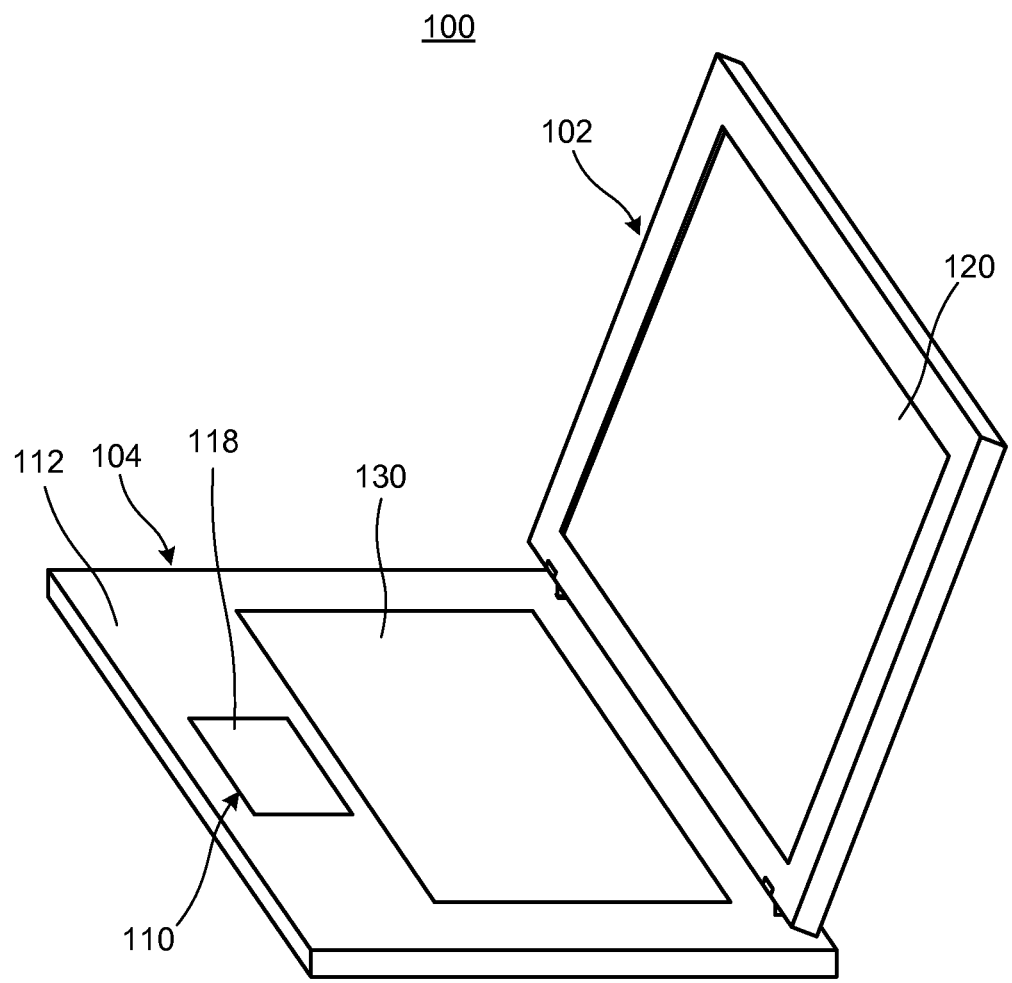
FIG. 1A is a diagram of a computing device including a tactile input device according to an example embodiment.

FIG. 1A is a diagram of a computing device 100 including a tactile input device 110 according to an example embodiment. Computing device 100 includes a display portion 102 and a base portion 104. Display portion 102 may include a display 120 that can be, for example, a liquid crystal display (LCD), a light emitting diode (LED) display, or other type of electronic visual display device. The base portion 104 can include, among other components, a tactile input device 110, a housing 112, and a keyboard portion 130.

The tactile input device 110 can include a sensor (not shown) and a top surface 118, configured to receive inputs (e.g., a touch, swipe, scroll, drag, click, hold, tap, combination of inputs, etc.) from a user. The sensor can be activated when a user enters an input on the top surface 118 of the tactile input device 110, and can communicate electronic signals within the computing device 100. The sensor can be, for example, a flame-retardant class-4 (FR4) printed circuit board. Other components, such as a dome switch, adhesive sheets, and cables (not shown), may also be integrated in computing device 100 to process input by a user via tactile input device 110 or keyboard 130. Various elements shown in the display 120 of the computing device 100 may be updated based on various movements of contacts on the tactile input device 110 or the keyboard 130.

Tactile input devices, such as tactile input device 110, may be used in self-contained portable laptop computers such as device 100, and do not require a flat surface near the computer. The tactile input device 110 may be positioned close to the keyboard 130. The tactile input device 110 may only use very short finger movements to move a cursor across the display 120. While advantageous, this also makes it difficult for a user to move his or her finger(s) across the surface 118 of the tactile input device 110 in a completely horizontal or vertical direction. Tactile input device functionality is also available for desktop computers in keyboards with built-in touchpads, and in mobile devices, as described in more detail below with respect to FIG. 6.

The components of the input devices (e.g., 110, 130) described here can be formed with a variety of different materials such as plastic, metal, glass, ceramic, etc. used for such components. For example, the top surface 118 and base member 104 can each be formed, at least in part, with an insulating material and/or conductive material such as a stainless steel material, for example, SUS301 or SUS304.

Some tactile input devices have "hotspots," which are locations on the tactile input device 110 used for functionality beyond a mouse. Some tactile input device drivers support tap zones, regions where a tap will execute a function, for example, pausing a media player or launching an application. Certain tactile input devices 110 may use two-finger dragging for scrolling. The tactile input devices and associated device driver software may interpret, for example, holding two fingers on the surface 118 of the tactile input device 110, and moving one or both of the fingers in a horizontal or vertical direction, as scrolling. All of these functions may be implemented in tactile input device driver software or firmware, and these functions can be modified or disabled.

In some computing devices, such as computing device 100, the tactile input device 110 may sense any number of fingers (such as up to five, or more) simultaneously, providing more options for input, such as the ability to bring up a menu by tapping two fingers, dragging two fingers for scrolling, or gestures for zoom in or out or rotate. Additionally, although input device 110 is depicted as a rectangle, it will be appreciated that input device 110 could be formed in a different shape, such as a circle, without departing from the scope of the techniques described here. The functionalities described herein, such as scrolling or zooming, may be interpreted by a gesture library as a single gesture.

Figure 1B:
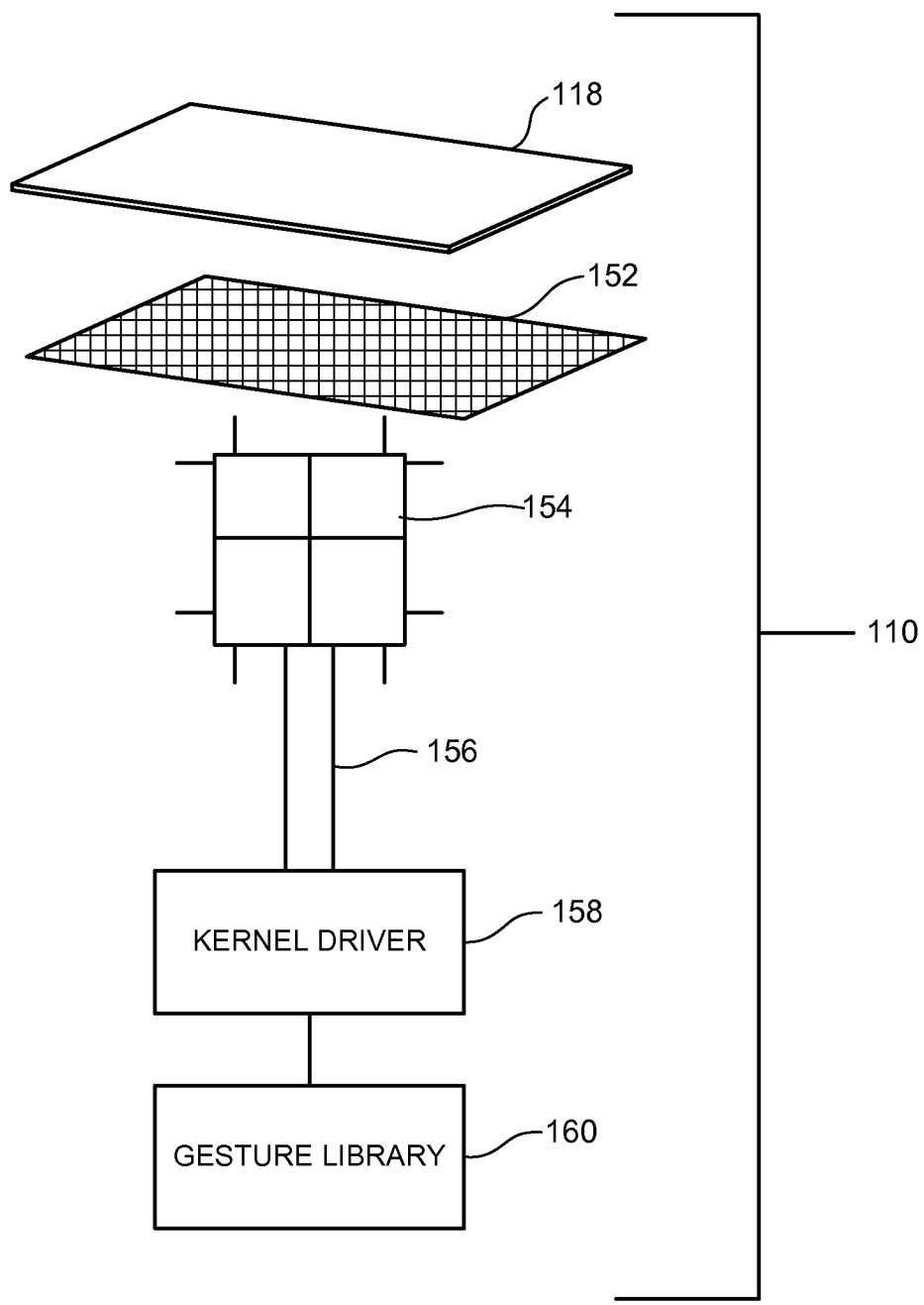
FIG. 1B is a diagram of the tactile input device and related components according to an example embodiment.

FIG. 1B is a diagram of the tactile input device 110 and related components according to an example embodiment. Tactile input device 110 includes the surface 118, a sensor 152, a controller 154, a bus 156, a kernel driver 158, and a gesture library 160.

The surface 118 may be configured to be contacted by a user to actuate and trigger an electrical response within the computing device 100. The surface 118 may, for example, be on top of the tactile input device 110 and above the sensor 152, parallel and flush or nearly flush with other components of the computing device 100 (shown in FIG. 1A), such as a top surface of the housing 112 of the base portion 104. The surface 118 may be operably coupled to the sensor 152. The sensor 152 can be activated when a user enters an input (e.g., a touch, swipe, or a click), such as by applying pressure on the top surface 118 of the tactile input device 110. The sensor 152 can be, for example, a flame-retardant class-4 (FR4) printed circuit board. The sensor 152 may be responsive to applications of pressure on the surface 118 and/or sensor 152, and may provide signals to a controller 154 indicating changes in resistance and/or capacitance in the sensor 152 based on the applications of pressure.

Controller 154 may be operably coupled to sensor 152. Controller 154 may be an embedded microcontroller chip and may include, for example, read-only firmware. Controller 154 may include a single integrated circuit containing a processor core, memory, and programmable input/output peripherals. Bus 156 may be a PS/2, I2C, SPI, WSB, or other bus. Bus 156 may be operably coupled to controller 154 and may communicate with kernel driver 158. Kernel driver 158 may include firmware and may also include and/or communicate with gesture library 160. Gesture library 160 may include executable code, data types, functions, and other files (such as JAVASCRIPT files) which may be used to process input to tactile input device 110 (such as multitouch gestures). Gesture library 160, in combination with kernel driver 158, bus 156, controller 154, sensor 152, and surface 118, may be used to implement various processes, such as the processes described herein.

The components of the tactile input device 110, and their interrelationships, as shown and described with respect to FIG. 1B, are merely an example. Functionalities of the gesture library 160 may be performed by the kernel driver 158 and/or controller 154, an operating system or application. The functionalities may, for example, be stored and/or included on a non-transitory computer-readable storage medium comprising instructions stored thereon that, when executed by a processor or the controller 154 of the computing system 100, are configured to cause the computing system 100 to perform any combination of the functionalities or processes described herein. Or, the tactile input device 110 may be designed as an application specific integrated circuit (ASIC) to perform the functions described herein.

Figure 1C:
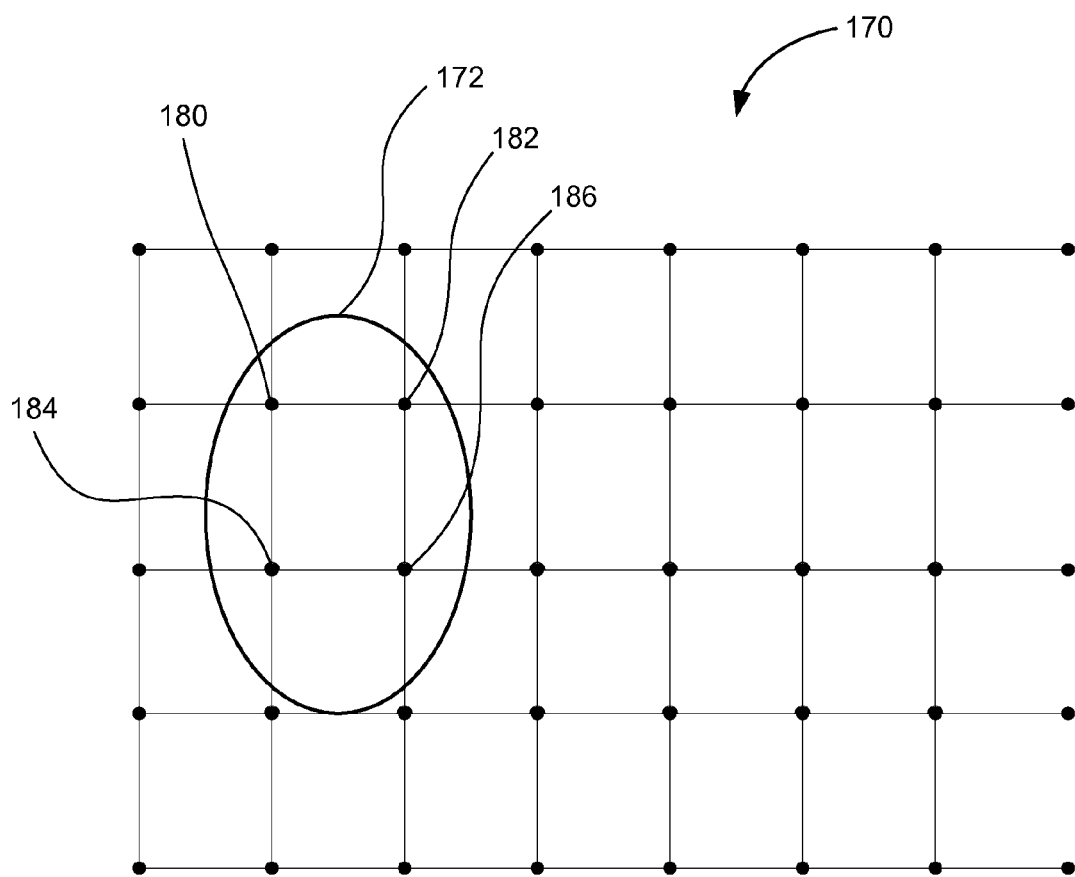
FIG. 1C is a diagram of a sensor grid according to an example embodiment.

FIG. 1C is a diagram of a sensor grid 170 according to an example embodiment. The sensor grid 170 may be included as part of the tactile input device 110, such as part of sensor 152 shown in FIG. 1B. Other implementations are possible, and the specific depiction of sensor grid 170 shown in FIG. 1C is merely for illustration. For example, the grid 170 may have any number of columns and rows, such as nine columns and twelve rows (instead of the eight columns and five rows shown in FIG. 1C), and may be formed in another shape (e.g., circular). The sensor grid 170 may include any number sensors, such as sensors 180, 182, 184, 186. The sensors 180, 182, 184, 186 may be spaced any distance (such as a few millimeters) apart from each other and may be designed to sense tactile input. The sensors 180, 182, 184, 186 may sense tactile input by sensing applications of pressure to the surface 118 of the tactile input device 110 (shown in FIGS. 1A and 1B), such as by detecting or determining resistance and/or capacitance levels. The resistance and/or capacitance levels may be changed by the received tactile input, such as changes or applications of pressure to the surface 118 and/or sensor 152.

Input 172, which may be a fingerpad contact, represents a position on the grid 170 when a user places a finger on the tactile input device 110. As shown in FIG. 1C, input 172 may span several rows and columns of sensors 180, 182, 184, 186 on grid 170. The sensors 180, 182, 184, 186, controller 154, kernel driver 158, and/or gesture library 160 may sense and/or determine an amount of pressure applied by the user's finger based on changes in the resistance and/or capacitance, and/or based on the number or area of sensors 180, 182, 184, 186 that detect the user's finger contacting the surface 118.

As discussed above, the tactile input device 110 may recognize two contacts on the sensor grid 170, which may be caused by separate fingers, as a scroll gesture. The scroll gesture may be recognized based on two contacts on the sensor grid being maintained, with at least one of the contacts moving in either a generally horizontal or generally vertical direction. The computing device 100 may recognize movement within a vertical directional zone as being vertical, and may recognize movement within a horizontal directional zone as being horizontal, allowing the user to scroll without moving in a completely vertical or horizontal direction.

The computing device 100 may require the two contacts to be close enough together to be related as a scroll gesture, but may also require the two contacts to be far enough apart to be considered separate contacts. For scrolling, the two taps, contacts, or applications of pressure on the tactile input device 110 should be close together, such as within a maximal threshold distance from each other, to ensure that the user was attempting to tap the same spot on the tactile input device 110. The first and second taps, contacts, or applications of pressure on the tactile input device 110 should also begin within a scrolling threshold period of time of each other, to ensure that the user is attempting the scroll, and has not simply made a second, unrelated tap, contact, or application of pressure on the tactile input device 110.

Figure 1D:
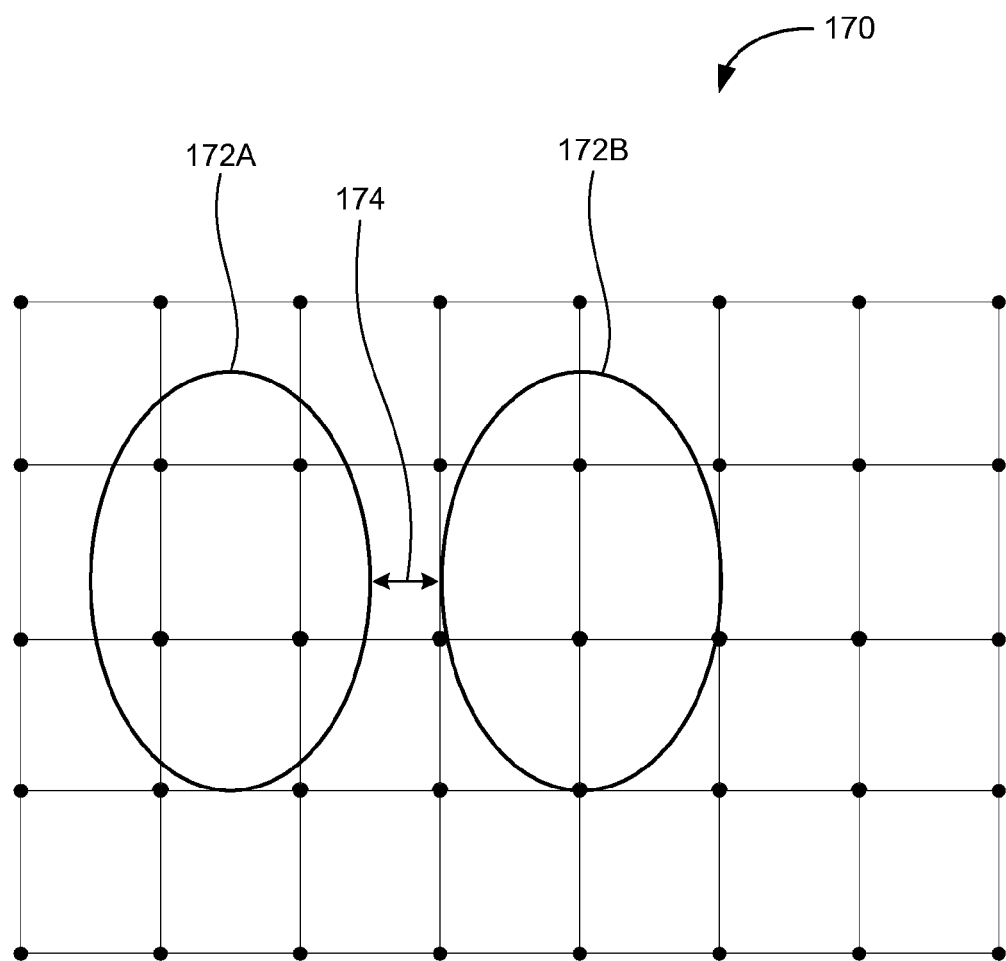
FIG. 1D is a diagram of the sensor grid showing a distance between two non-overlapping contacts detected on the tactile input device according to an example embodiment.

FIG. 1D is a diagram of the sensor grid 170 showing a distance 174 between two taps, contacts 172A, 172B, or applications of pressure detected on the tactile input device 110 (not shown in FIG. 1D) according to an example embodiment. The contacts 172A, 172B may be non-overlapping to ensure that they resulted from two separate fingers. The contacts 172A, 172B may be examples of the input 172 shown in FIG. 1C. The contacts 172A, 172B may be partially or fully concurrent in time. The first contact 172A may have begun first, and after the initiation of the first contact 172A, while the first contact 172A is still on the tactile input device 110 and detected by the sensor 152 (not shown in FIG. 3A), the first contact 172A may be followed by the second contact 172B within the scrolling threshold period of time, with the first contact 172A being maintained while the second contact 172B is made, or the first and second contacts 170A, 170B may have occurred simultaneously.

A distance 174 may be measured from opposing or near outer portions of the contacts 172A, 172B, as shown in FIG. 1D, or may be measured from other portions of the contacts 172A, 172B, such as from central portions or farthest outer portions of the contacts 172A, 172B according to example embodiments. The tactile input device 110 may average multiple distances, or take a longest or shortest distance, between the contacts 172A, 172B, to determine whether the two contacts 172A, 172B were within the threshold distance of each other. The computing device 100 may require the two contacts 172A, 172B to be within a maximal distance of each other to recognize the two contacts 172A, 172B as a single gesture (such as a scroll), ensuring, for example, that the two contacts 172A, 172B are from adjacent fingers of the same hand, and/or may require the contacts 172A, 172B to be at least a minimal threshold distance from each other to recognize the two contacts 172A, 172B as a single gesture (such as a scroll), ensuring, for example, that the two contacts 172A, 172B are from different fingers.

The user may move one or both fingers either vertically or horizontally to scroll vertically or horizontally, and the sensor 152 may detect the movement of the user's finger(s) along the surface 118 and associated sensor grid 170. In determining a direction and/or magnitude of movement of the contacts 172A, 172B, the computing system 100, including the tactile input device 110, controller 154, kernel driver 158, and/or gesture library 160, may utilize any of a number of different techniques to determine the direction and/or magnitude. Techniques for determining a direction and/or magnitude of each contact 172A, 172B are discussed with respect to FIGS. 4B and 4C. Once the direction and/or magnitude for each of the two contacts 172A, 172B have determined, the computing device 100 may utilize any of a number of different functions to determine a common direction and/or magnitude of the two contacts 172A, 172B. The computing device 100 may utilize the direction and magnitude of the contact 172A, 172B which moved the farthest, may average the directions and magnitudes of movement of the two contacts 172A, 172B, may use a weighted average of the direction and magnitude of movement of the two contacts 172A, 172B, or may determine whether one or both of the contacts 172A, 172B met a threshold magnitude of movement and utilize the direction of the contact(s) which met the threshold magnitude of movement, according to various example embodiments.

Figure 1E:
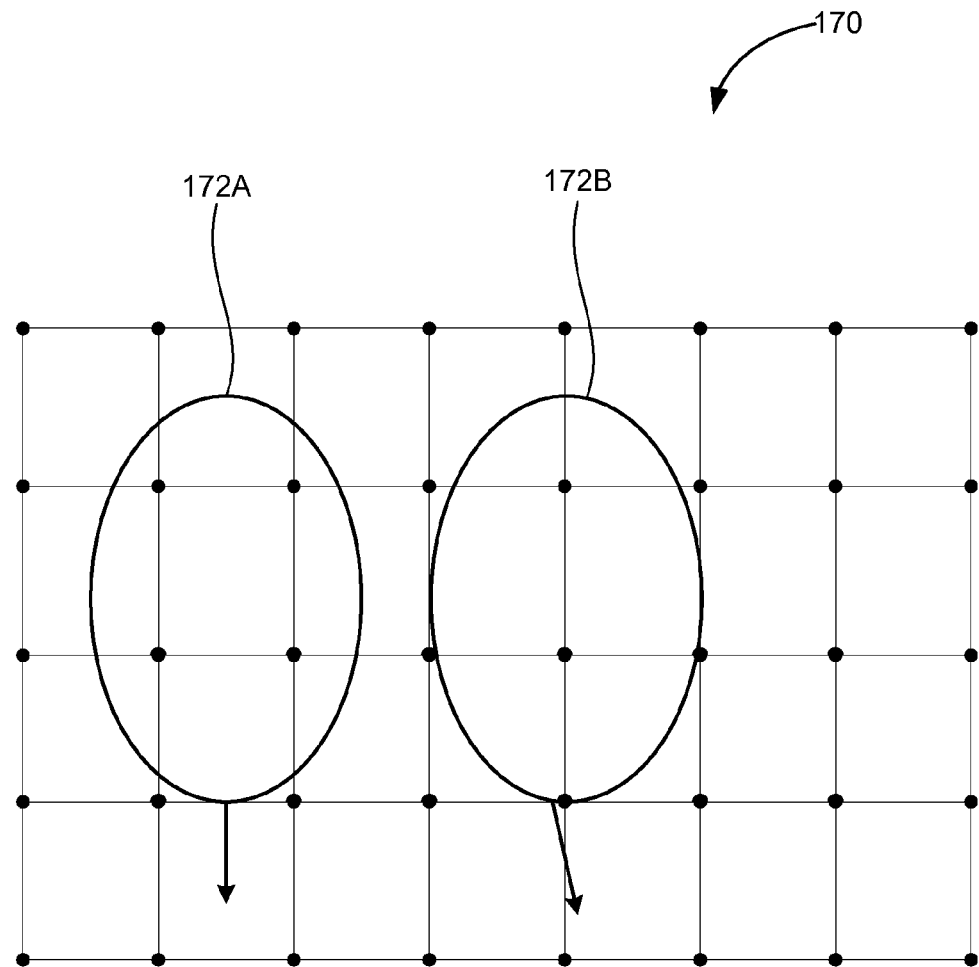
FIG. 1E is a diagram showing two contacts moving down on the sensor grid according to an example embodiment.

FIG. 1E is a diagram showing the two contacts 172A, 172B moving down on the sensor grid 170 according to an example embodiment. In this example, the first contact 172A is moving straight down, but the second contact 172B is moving down and to the right. Both the first and second contacts 172A, 172B may be moving within a "down" directional zone defined by the computing device 100. The computing device 100 may determine that both contacts 172A, 172B are moving within the down directional zone. Based on the determination that both contacts 172A, 172B are moving within the down directional zone, the computing device 100 may recognize the movements as a down scroll gesture. If the contacts 172A, 172B were similarly moving up, the computing device 100 could recognize an up scroll gesture.

Figure 1F:
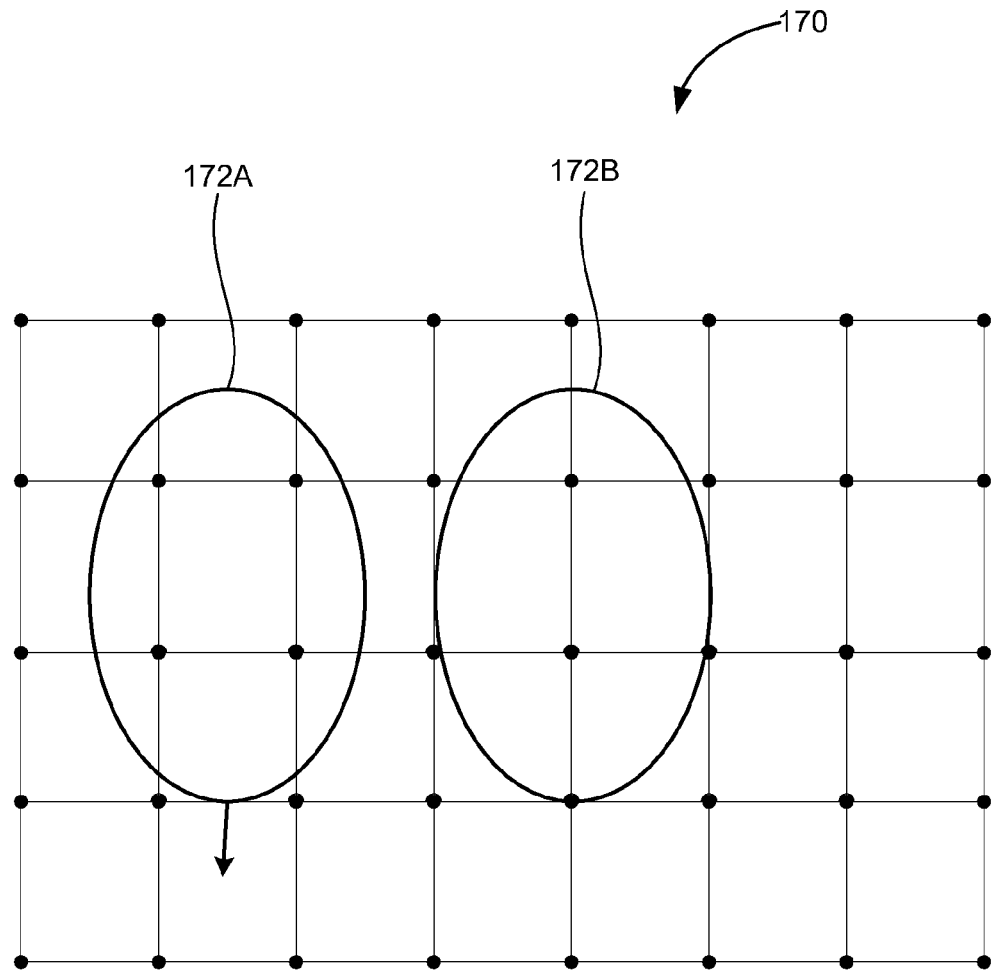
FIG. 1F is a diagram showing a first contact stationary and a second contact moving down on the sensor grid according to an example embodiment.

FIG. 1F is a diagram showing the first contact 172A stationary and the second contact 172B moving down on the sensor grid 170 according to an example embodiment. In this example, the first contact 172A may not be moving straight down, but may be moving down and to the left. The movement of the first contact 172A may be within the down directional zone. The computing device 100 may determine that the first contact is moving within the down directional zone. Based on the determination that the first contact 172A is moving within the down directional zone, and that the second contact 172B is stationary, the computing device 100 may recognize the contacts 172A, 172B as a down scroll gesture. If the first contact 172A were similarly moving up, with the second contact 172B stationary, the computing device 100 could recognize an up scroll gesture.

Figure 1G:
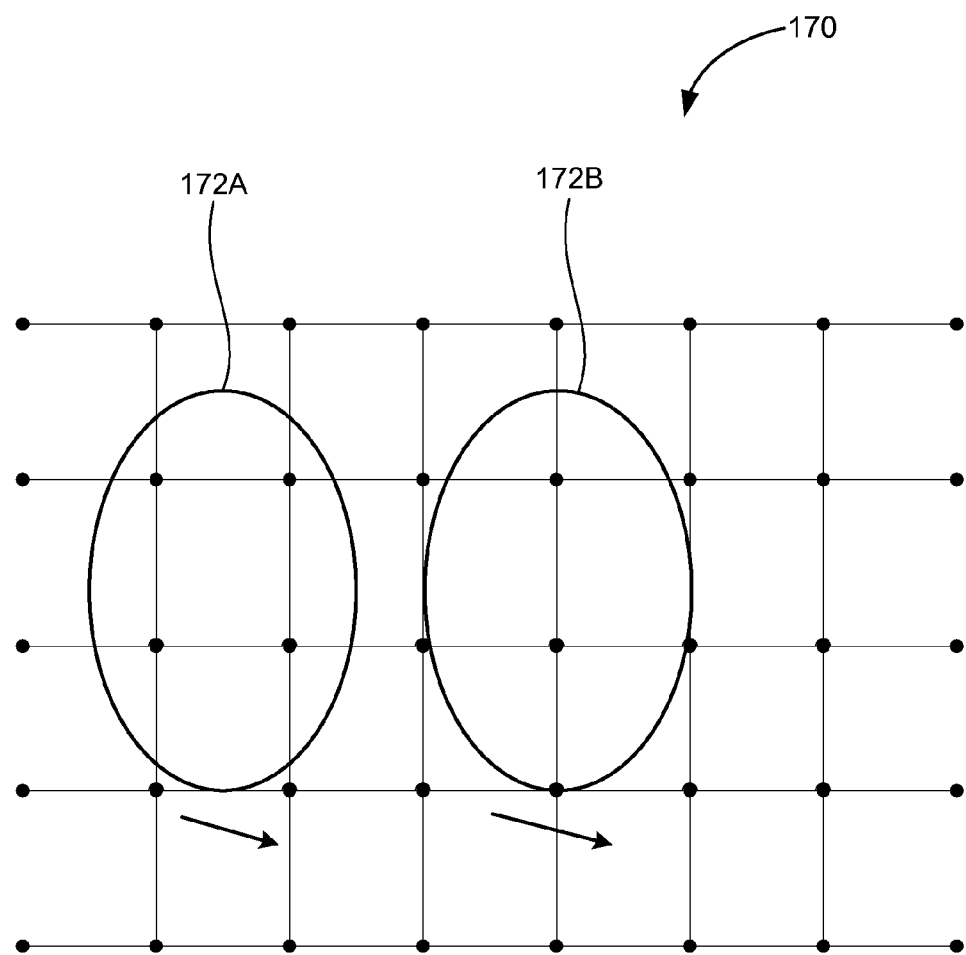
FIG. 1G is a diagram showing two contacts moving right on the sensor grid according to an example embodiment.

FIG. 1G is a diagram showing the two contacts 172A, 172B moving right on the sensor grid 170 according to an example embodiment. In this example, the first and second contacts 172A, 172B may not be moving straight to the right, but may be moving to the right and down. The movement of the first and second contacts 172A, 172B may be within a "right" directional zone defined by the computing device 100. The computing device 100 may determine that both contacts 172A, 172B are moving within the right directional zone. Based on the determination that both contacts 172A, 172B are moving within the right directional zone, the computing device 100 may recognize the movements as a right scroll gesture. If the contacts 172A, 172B were similarly moving left, the computing device 100 could recognize left scroll gesture. The computing device 100 could also recognize a left or right scroll gesture if only one of the contacts 172A, 172B were moving within the left or right directional zone and the other contact 172A, 172B was stationary, according to an example embodiment.

Figure 2:
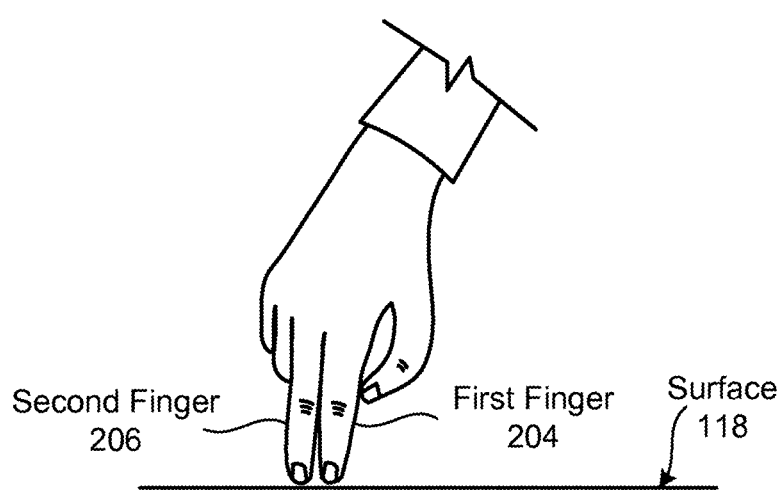
FIG. 2 is a diagram showing two fingers contacting a surface of the tactile input device according to an example embodiment.

FIG. 2 is a diagram showing two fingers 202, 204 contacting the surface 118 of the tactile input device 110 (not shown in FIG. 2) according to an example embodiment. The user may touch the surface 118 with two fingers 202, 204, and drag one or both fingers 202, 204 up, down, left, or right, to scroll up, down, left, or right, respectively, and the tactile input device 100 may recognize the scrolling gesture, as discussed above with respect to FIGS. 1D, 1E, 1F, and 1G.

Figure 3A:
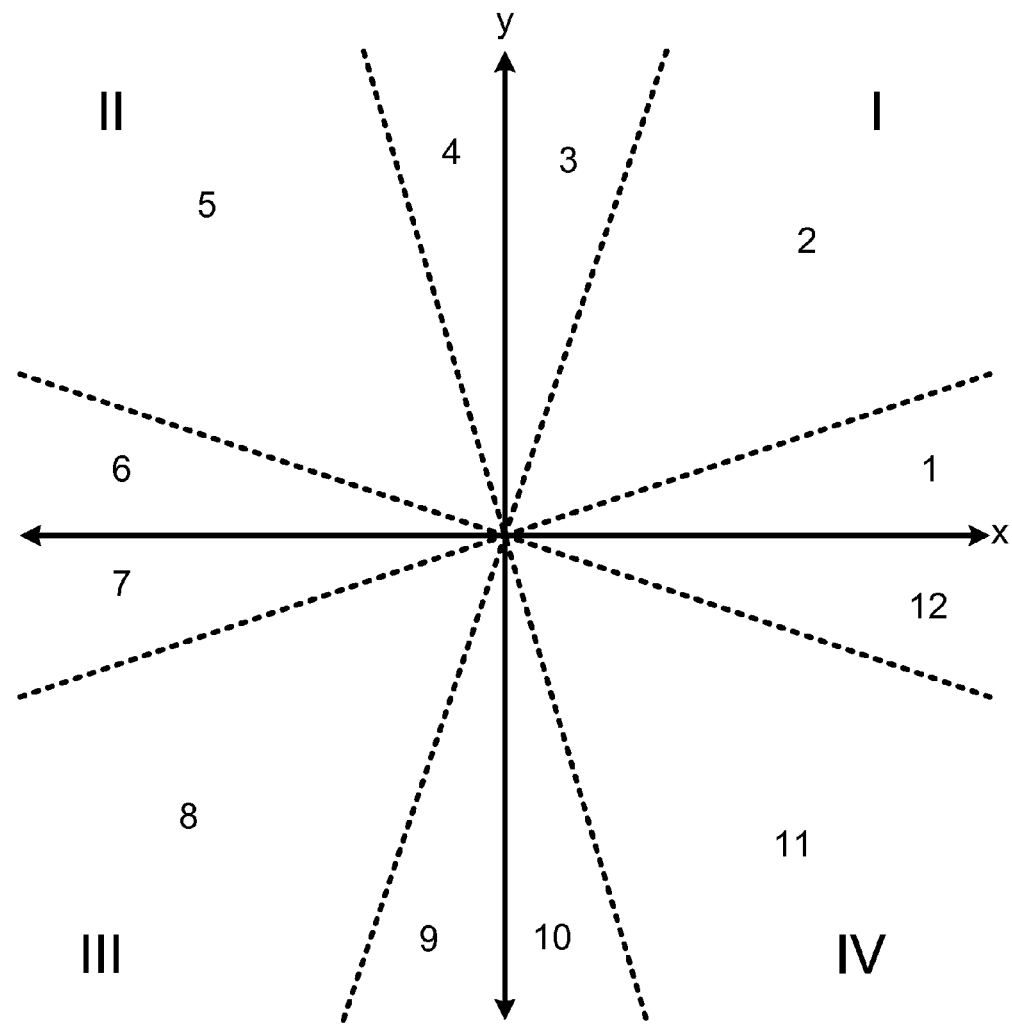
FIG. 3A is a graph including twelve directional zones according to an example embodiment.

FIG. 3A is a graph including twelve directional zones according to an example embodiment. In this example, three directional zones have been defined for each of the four quadrants of the graph, for a total of twelve directional zones. In quadrant I, a right directional zone 1, which includes a major right component and a minor up component, has been defined. Also in quadrant I, a diagonal directional zone 2, with intermediary right and up components, has been defined. Also in quadrant I, an up directional zone, which includes a major up component and a minor right component, has been defined.

In quadrant II, an up directional zone 4, which includes a major up component and a minor left component, has been defined. Also in quadrant II, a diagonal directional zone 5, which includes intermediary up and left components, has been defined. Also in quadrant II, a left directional zone 6, which includes a major left component and a minor up component, has been defined.

In quadrant III, a left directional zone 7, which includes a major left component and a minor down component, has been defined. Also in quadrant III, a diagonal zone 8, which includes intermediary left and down components, has been defined. Also in quadrant III, a down zone 9, which includes a major down component and a minor left component, has been defined.

In quadrant IV, a down directional zone 10, which includes a major down component and a minor right component, has been defined. Also in quadrant IV, a diagonal zone 11, which includes intermediary down and right components, has been defined. Also in quadrant IV, a right zone 12, which includes a major right component and a minor down component, has been defined.

The horizontal zones (1, 6, 7, 12) and vertical zones (3, 4, 9, 10) may be based on ratios (e.g., five-to-one or ten-to-one) between the respective horizontal and vertical components, or based on angles of movement. The ratios or angles may be defined in software or firmware, and may be adjusted based on experiments with users and/or based on the particular user of the tactile input device 110, according to example embodiments.

Figure 3B:
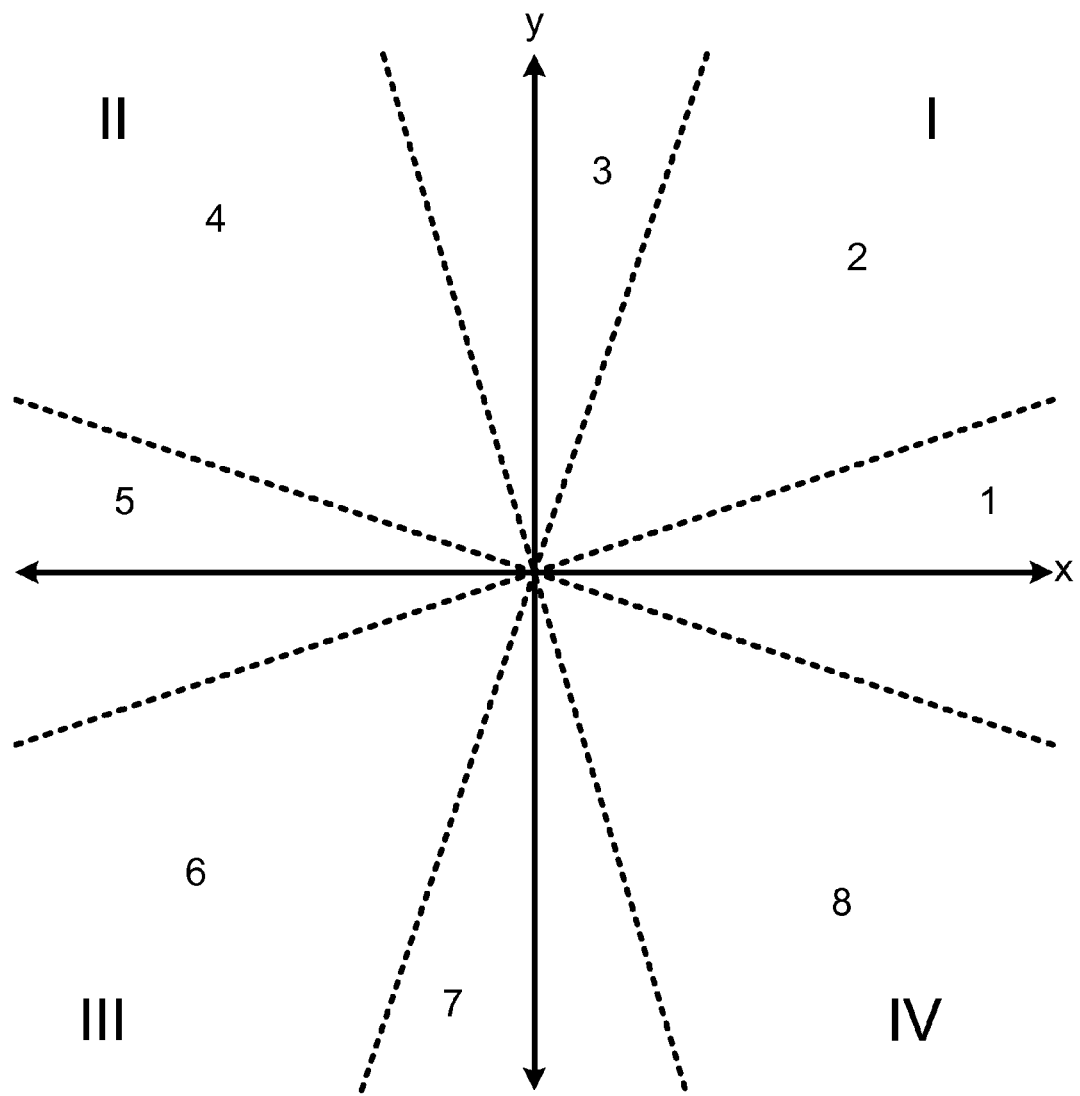
FIG. 3B is a graph including eight directional zones according to another example embodiment.

FIG. 3B is a graph including eight directional zones according to another example embodiment. In this example, directional zones from adjacent quadrants I, II, III, IV have been collapsed into single zones, for a total of eight directional zones. In this example, the right zones 1, 12 in quadrants I and IV shown in FIG. 3A have been collapsed into a single right zone 1, up zones 3, 4 in quadrants I and II shown in FIG. 3A have been collapsed into a single up zone 3, left zones 6, 7 in quadrants II, III shown in FIG. 3A have been collapsed into a single left zone 5, and down zones 9, 10 in quadrants III, IV shown in FIG. 3A have been collapsed into a single down zone 7. Diagonal zones 2, 5, 8, and 11 shown in FIG. 3A have been renumbered as diagonal zones 2, 4, 6, and 8, respectively.

While twelve and eight directional zones have been defined in the examples shown in FIGS. 3A and 3B, respectively, any number of directional zones may be defined. The computing system 100 may modify the directional components of the user's movement based on the directional zone within the user has moved his or her finger(s).

Figure 4A:
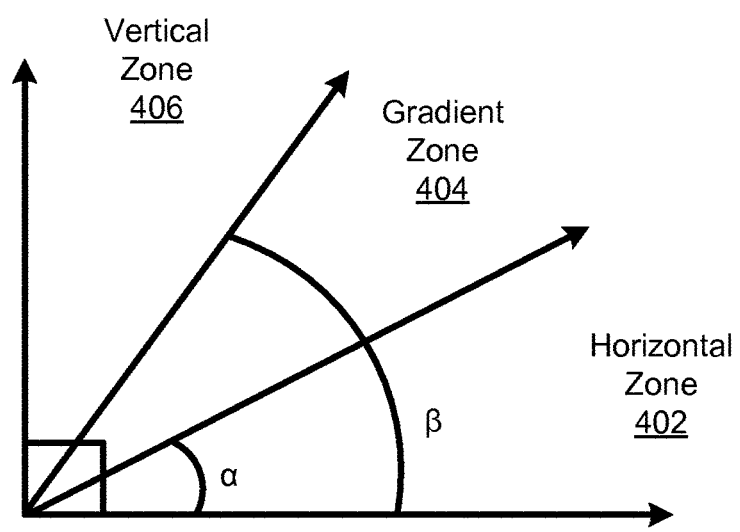
FIG. 4A is a diagram of a quadrant including directional zones according to an example embodiment.

FIG. 4A is a diagram of a quadrant including directional zones according to an example embodiment. The quadrant shown in FIG. 4A may correspond to quadrant I shown in FIGS. 3A and 3B, or may be used after the computing system 100 has determined the absolute value or magnitude of the direction of movement of the contact(s) 172A, 172B.

A horizontal zone 402, gradient zone 404, and vertical zone 406 may correspond to the right zone 1, diagonal zone 2, and up zone 3 shown in FIGS. 3A and 3B. The software or firmware may define a first angle, a, from the horizontal axis, within which the movement may be considered to be within the horizontal zone 402. In an example embodiment, the value of a may be 30°. The computing system 100 may determine that movements for which the angle from the horizontal axis is less than, or equal to or less than, a, are within the horizontal zone 402. Movements within the horizontal zone 402 may be considered either left or right. If the movement is within the horizontal zone 402, the computing system 100 may modify the vertical component (up or down) of the movement, such as by eliminating or setting to zero the vertical component, or multiplying the vertical component by a value between zero and one.

The software or firmware may define a second angle, β, from the horizontal axis, beyond which the movement may be considered to be within the vertical zone 406. In an example embodiment, the value of 0 may be 50°. The computing system 100 may determine that movements for which the angle from the horizontal axis is greater than, or equal to or greater than, β, are within the vertical zone 406. Movements within the vertical zone 406 may be considered up or down. If the movement is within the vertical zone 406, the computing system 100 may modify the horizontal component (right or left), such as by eliminating or setting to zero the horizontal component, or multiplying the horizontal component by a value between zero and one.

For movements within the gradient zone 404 (or diagonal directional zone as discussed with respect to FIGS. 3A and 3B), the computing system 100 may leave both the horizontal and vertical components unmodified. Or the computing system 100 may modify one of the horizontal or vertical component to ease the transition from the horizontal or vertical zone 402, 406 into the gradient zone 404. For example, for movements within the gradient zone 404 that are close to the horizontal zone, the computing system 100 may reduce the vertical component, and for movements within the gradient zone 404 that are close to the vertical zone 406, the computing system 100 may reduce the horizontal component.

The computing system 100 may determine directions of movements of contacts 172, 172A, 172B by tracking changes in positions of the contacts 172, 172A, 172B. The computing system 100 may, for example, record or store the locations of the contacts 172, 172A, 172B periodically, and determine movement by the direction of travel of successive recorded locations.

Figure 4B:
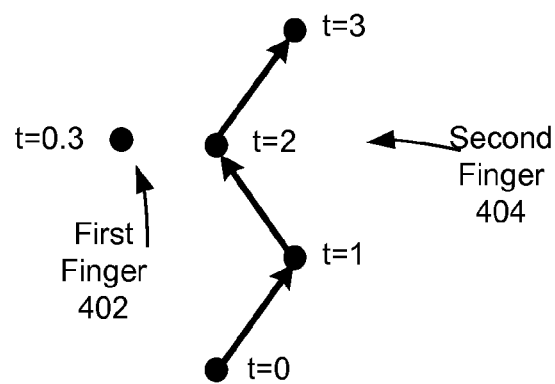
FIG. 4B is a diagram showing locations of contacts according to an example embodiment.

FIG. 4B is a diagram showing locations of contacts according to an example embodiment. In this example, a first finger 402 may remain stationary from times 0 . . . 3. A second finger 404 may change locations as shown by the dots labeled t=0, t=1, t=2, t=3. The arrows between the dots, i.e., between the t=0 dot and the t=1 dot, between the t=1 and the t=2 dot, and between the t=2 dot and the t=3 dot, show the directions of movement at successive sampling points. These directions of movement may be considered deltas, representing the changes of locations.

The movements, or changes of location between periodic sampling times, may be required to meet minimum distance thresholds. For example, if the movement or change of location does not meet a minimum distance threshold, then the contact may be considered to remain stationary, and to not move. The distance thresholds may be applied between individual sampling points, requiring a threshold movement between each sampling point, or between multiple sampling points, requiring a threshold movement a predetermined number of sampling points after a given sampling point, according to example embodiments.

In this example, from t=0 to t=1, the direction of movement may include a major vertical (up) component and a minor horizontal (right) component. From t=1 to t=2, the direction of movement may include a major vertical (up) component and a minor horizontal (left) component. From t=2 to t=3, the direction of movement may again include a major vertical (up) component and a minor horizontal (right) component.

Figure 4C:
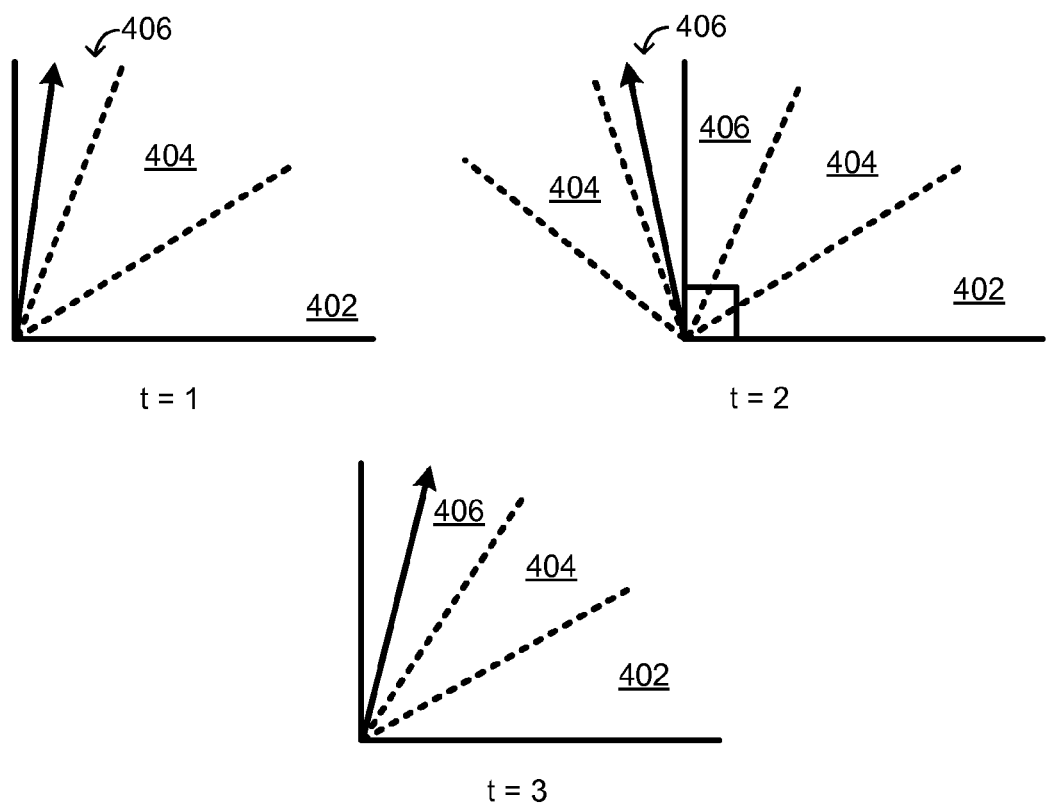
FIG. 4C includes diagrams showing the deltas of the contacts of FIG. 4B according to an example embodiment.

FIG. 4C includes diagrams showing the deltas of the contacts of FIG. 4B according to an example embodiment. At each of t=1, t=2, and t=3, the movement of the contact was not completely vertical, but was within the vertical zone 406. While the horizontal component (left or right) changed in opposite directions from t=1 to t=2, and from t=2 to t=3, the horizontal components were still small enough, compared to the major (up) vertical components, to keep the movements within the vertical zone 406. Based on these movements being within the vertical zone 406, and within the up zone(s) described with respect to FIGS. 3A and 3B, the computing system 100 may determine that the user us making an up scroll. The computing system 100 may make a determination as to whether the user is making a scrolling gesture for each delta or periodic sample (i.e. at each of t=1, t=2, and t=3), or may determine whether the user is making a scrolling gesture based on an average of a predetermined number of preceding deltas or periodic samples, such as based on the last three (or any other number) of deltas and/or samples.

Figure 5:
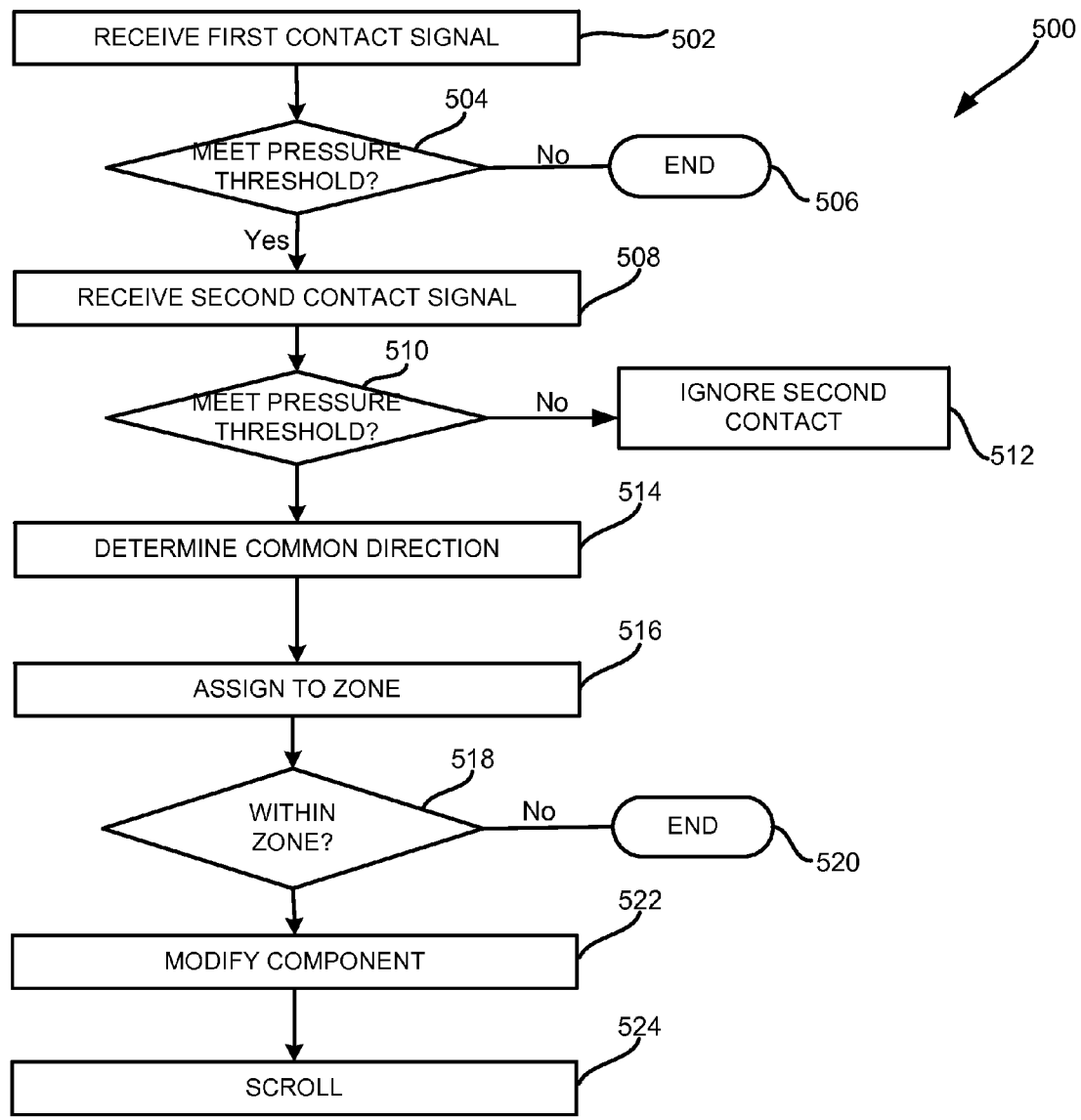
FIG. 5 is a flow diagram showing an exemplary process.

FIG. 5 is a flow diagram showing an exemplary process 500. The computing system 100 may perform or execute the process 500 to recognize a scroll gesture by a user on a tactile input device 110 such as a trackpad or touch pad.

The computing system 100, including the controller 154, kernel driver 158, and/or gesture library 160, may receive a first contact signal from the sensor 152 of the tactile input device 110 (502). The signal may represent the first contact 172A of the user's first finger 204 on the surface 118 of the tactile input device 110. The signal may also indicate the maintenance and movement of the first contact 172A. While the "signal" has been referred to as indicating the initiation, maintenance, and movement of the first contact 172A, the "signal" may include multiple signals indicating the initiation, maintaining, and release of the first contact 172A.

The computing system 100 may determine whether the first contact 172A represented by the first contact signal met a pressure threshold (504), ensuring that a minimum amount of pressure was applied to the surface 118 of the tactile input device 210 for the contact 172A to be recognized as an input into the computing device 100. If the first contact 172A did not meet the threshold of pressure, then the process 500 may end (506).

The computing system 100 may also receive another contact signal from the sensor 152 of the tactile input device 110 (508). The second contact signal may represent the contact 172B of the user's second finger 206 on the surface 118 of the tactile input device 110. The second contact signal may also indicate the maintenance and movement of the second contact 172B. While the "signal" has been referred to as indicating the initiation, maintenance, and movement of the second contact 172B, the "signal" may include multiple signals indicating the initiation, maintaining, and release of the first contact 172B.

The computing system 100 may determine whether the second contact 172B met a pressure threshold (510), ensuring that a minimum amount of pressure was applied to the surface 118 of the tactile input device 210 for the contact 172B to be recognized as an input into the computing device 100. If the second contact 172B did not meet the threshold of pressure, then the computing system 100 may ignore the second contact 172B (512).

The computing system 100 may determine a common direction of the first and second contacts 172A, 172B (514). The computing system 100 may determine the direction of movement each of the first and second contacts 172A, 172B as discussed above with respect to FIG. 4B. After determining the direction of movement for each of the first and second contacts 172A, 172B, the computing system 100 may determine a common direction of movement, such as by averaging the two directions of movement, or by accepting the direction of movement of the contact 172A, 172B with the greater magnitude of movement, or by a weighted average of the movements of the first and second contacts 172A, 172B, according to example embodiments.

After determining the common direction of movements for the first and second contacts 172A, 172B (514), the computing system 100 assigns the common direction of movement to a directional zone (516). The computing system 100 may assign the direction of movement to a directional zone as described above with respect to FIGS. 3A, 3B, 4A, and 4C.

After assigning the direction of movement to a directional zone (516), the computing system 100 may determine whether the direction of movement and/or assigned directional zone is within a defined zone (518). The defined zones may include the left, right, up, and down zones shown and described with respect to FIG. 3A, 3B, or the horizontal and vertical zones shown and described with respect to FIGS. 4A and 4C. Or, the defined zones may also include the diagonal zones to ease the transition into the diagonal zones. If the direction of movement and/or assigned zone is not within a defined zone (such as a left, right, up, down, horizontal, or vertical zone), then no change may be made to the direction of movement, and the process may end (520).

If the direction of movement is within a defined zone, then the computing system 100 may reduce or modify a component of the direction of movement (522). For example, if the direction of movement is within a horizontal zone, then the computing system may reduce, eliminate, or discard the vertical component of the movement. If the direction of movement is within a vertical zone, then the computing system may reduce, eliminate, or discard the horizontal component of the movement.

If the process 500 results in a horizontal movement or a vertical movement, the computing system 100 may recognize a scroll gesture. The gesture library 160 or other component of the tactile input device 110 may output a scroll gesture (524). An application running or executing on the computing device 100 may receive the scroll gesture, and may respond by moving object, or a window, or frame, vertically or horizontally based on whether the scroll was vertical or horizontal. The display 120 of the computing device 100 may move objects, a window, or a frame across the display 120 based on the received scroll.

Figure 6:
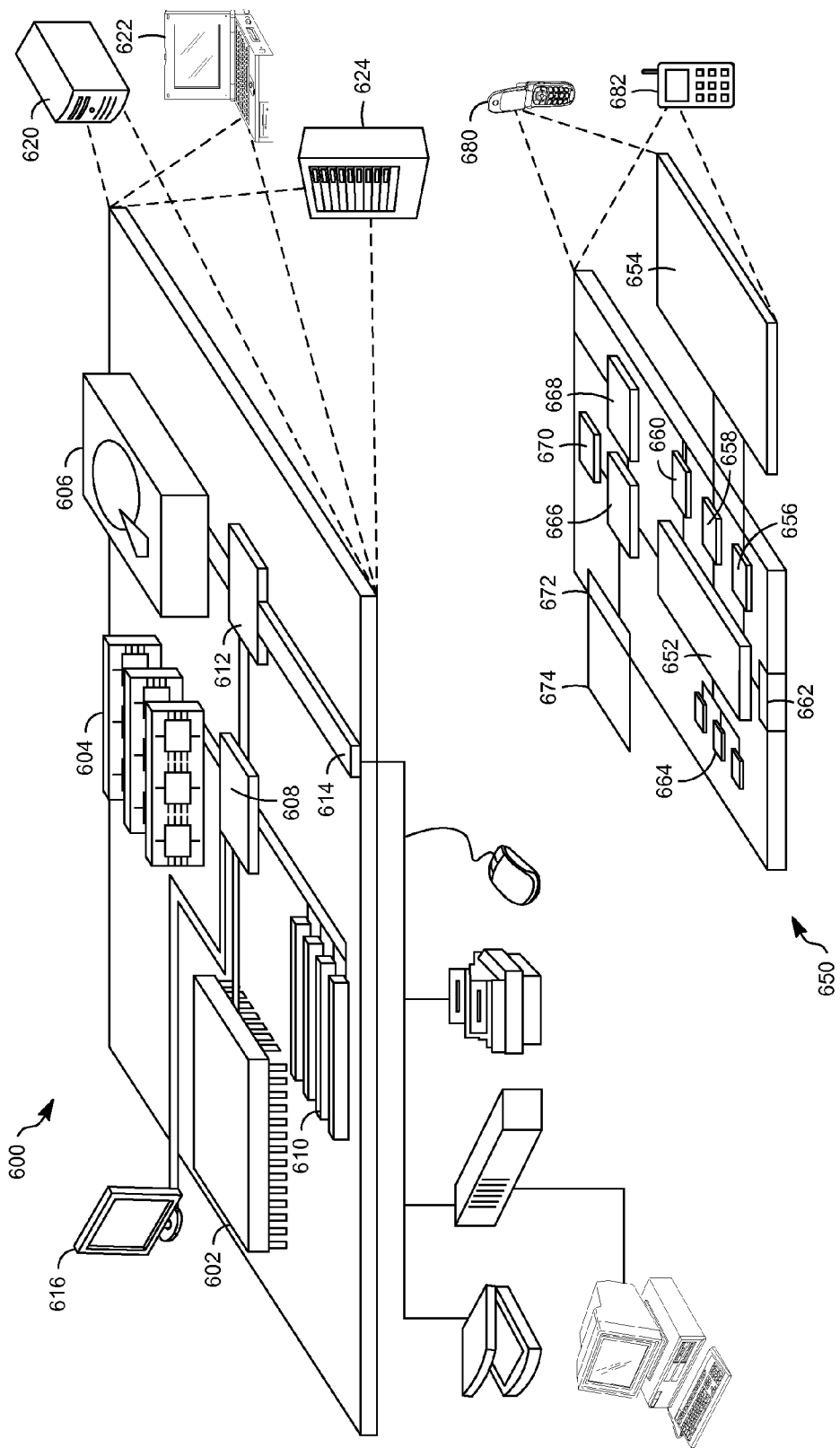
FIG. 6 is a diagram showing example or representative computing devices and associated elements that may be used to implement the systems and methods of FIGS. 1-5.

FIG. 6 is a block diagram showing example or representative computing devices and associated elements that may be used to implement the systems and methods of FIGS. 1-5. FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning system) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in FIG. 6. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to at least:
   receive, on a tactile input device of the computing system, a first contact and a second contact, the first and second contacts being maintained on the tactile input device, at least one of the first and second contacts changing location on the tactile input device;
   determine a distance and direction of movement by the first contact on the tactile input device;
   determine a distance and direction of movement by the second contact on the tactile input device;
   determine that both the first contact and the second contact moved at least a threshold distance, the threshold distance being greater than zero;
   based on determining that both the first contact and the second contact moved at least the threshold distance, determine a common direction of movement based on either the first contact or the second contact that has a greater distance of movement;
   assign the common direction of movement to one of a plurality of directional zones; and
   modify the common direction of movement based on the directional zone to which the common direction of movement was assigned.

2. The computer-readable storage medium of claim 1, wherein the determining the common direction of movement includes determining a common distance and direction of movement based on a distance and direction of movement of either the first contact or second contact that has the greater distance of movement.

3. The computer-readable storage medium of claim 1, wherein the assigning includes assigning the common direction of movement to one of eight directional zones.

4. The computer-readable storage medium of claim 1, wherein the assigning includes assigning the common direction of movement to one of twelve directional zones.

5. The computer-readable storage medium of claim 1, wherein the modifying the common direction of movement comprises reducing either a horizontal component or a vertical component of the common direction of movement based on the directional zone to which the common direction of movement was assigned.

6. The computer-readable storage medium of claim 1, wherein the modifying the common direction of movement comprises reducing the smaller of a horizontal component and a vertical component of the common direction of movement.

7. The computer-readable storage medium of claim 1, wherein the modifying the common direction of movement comprises reducing to zero either a horizontal component or a vertical component of the common direction of movement based on the assigned directional zone.

8. The computer-readable storage medium of claim 1, wherein the instructions are further configured to cause the computing system to recognize the common direction of movement as either a vertical scroll gesture or a horizontal scroll gesture based on the modification of the common direction of movement.

9. The computer-readable storage medium of claim 1, wherein the instructions are further configured to cause the computing system to move an image on a display associated with the tactile input device either vertically or horizontally based on the common direction of movement.

10. The non-transitory computer-readable storage medium of claim 1, wherein the determining the distance and direction of movement of the first contact and the determining the distance and direction of movement of the second contact are performed based on a determination that the first contact is within a maximal threshold distance of the second contact.

11. The non-transitory computer-readable storage medium of claim 1, wherein the determining the distance and direction of movement of the first contact and the determining the distance and direction of movement of the second contact are performed based on a determination that the first contact is at least a minimal threshold distance from the second contact, the minimal threshold distance being non-zero.

12. A computing system comprising:
   a display;
   a tactile input device comprising at least one sensor;
   at least one processor configured to execute instructions, receive input signals from the at least one sensor of the tactile input device, and send output signals to the display; and
   at least one memory device comprising instructions stored thereon that, when executed by the at least one processor, are configured to cause the computing system to at least:
      receive, on the tactile input device, a first contact and a second contact, the first and second contacts being maintained on the tactile input device, both of the first and second contacts changing location on the tactile input device;
      determine a distance and direction of movement by the first and second contacts based on both of the first and second contacts changing locations on the tactile input device;
      determine a common direction of movement based on either the first contact or the second contact that has a greater distance of movement;
      assign the common direction of movement to one of a plurality of directional zones; and
      modify the common direction of movement based on the directional zone to which the common direction of movement was assigned.

13. The computing system of claim 12, wherein the determining the common direction of movement includes:

determining that both the first contact and the second contact moved at least a threshold distance, the threshold distance being greater than zero; and determining the common direction of movement based on a longest movement of the first and second contacts.

14. The computing system of claim 12, wherein the assigning includes assigning the common direction of movement to one of eight directional zones.

15. The computing system of claim 12, wherein the assigning includes assigning the common direction of movement to one of twelve directional zones.

16. The computing system of claim 12, wherein the modifying the common direction of movement comprises reducing either a horizontal component or a vertical component of the common direction of movement based on the directional zone to which the common direction of movement was assigned.

17. The computing system of claim 12, wherein the modifying the common direction of movement comprises reducing the smaller of a horizontal component and a vertical component of the common direction of movement.

18. The computing system of claim 12, wherein the modifying the common direction of movement comprises reducing to zero either a horizontal component or a vertical component of the common direction of movement based on the assigned directional zone.

19. The computing system of claim 12, wherein the instructions are further configured to cause the computing system to recognize the common direction of movement as either a vertical scroll gesture or a horizontal scroll gesture based on the modification of the common direction of movement.

20. The computing system of claim 12, wherein the instructions are further configured to cause the computing system to move an image on the display either vertically or horizontally based on the modified common direction of movement.

21. A method comprising:
receiving, on a tactile input device, a first contact and a second contact, the first and second contacts being maintained on the tactile input device, at least one of the first and second contacts changing location on the tactile input device;
determining a direction of movement by the first and second contacts based on:
determining a distance and direction of movement of the first contact
determining a distance and direction of movement of the second contact
both of the first and second contacts changing locations on the tactile input device; and
a longest distance of movement of the first and second contacts;
assigning the determined direction of movement, of either the first contact or the second contact that has a greater distance of movement, to one of a plurality of directional zones; and
modifying the determined direction based on the assigned directional zone.

22. The method of claim 21, wherein the assigning includes assigning the determined direction of movement to one of eight directional zones.

23. The method of claim 21, wherein the assigning includes assigning the determined direction of movement to one of twelve directional zones.

24. The method of claim 21, wherein the modifying the determined direction comprises reducing either a horizontal component or a vertical component of the determined direction of movement based on the assigned directional zone.

25. The method of claim 21, wherein the modifying the determined direction comprises reducing the smaller of a horizontal component and a vertical component of the determined direction of movement.

26. The method of claim 21, further comprising:
determining that the first contact is at least a minimal threshold distance from the second contact, the minimal threshold distance being non-zero,
wherein the determining the direction of movement is performed based on both of the first and second contacts changing locations on the tactile input device, the first contact being at least the minimal threshold distance from the second contact, and based on a longest movement of the first and second contacts.

27. A computing system comprising:
a display;
a tactile input device comprising at least one sensor;
at least one processor configured to execute instructions, receive input signals from the at least one sensor of the tactile input device, and send output signals to the display; and
at least one memory device comprising instructions stored thereon that, when executed by the at least one processor, are configured to cause the computing system to at least:
receive, on the tactile input device, a first contact and a second contact, the first and second contacts being maintained on the tactile input device, at least one of the first and second contacts changing location on the tactile input device;
determine a direction of movement by the first and second contacts based on:
determining a distance and direction of movement of the first contact
determining a distance and direction of movement of the second contact
both of the first and second contacts changing locations on the tactile input device; and
averaging directions of movement of the first and second contacts;
assign the determined direction of movement to one of a plurality of directional zones based on the averaged directions of movement; and
modify the determined direction based on the assigned directional zone.

* * * * *